(12) United States Patent
Friesen et al.

(10) Patent No.: US 12,439,724 B2
(45) Date of Patent: Oct. 7, 2025

(54) SILICON-GERMANIUM ALLOY-BASED QUANTUM DOTS WITH INCREASED ALLOY DISORDER AND ENHANCED VALLEY SPLITTING

(71) Applicants: Wisconsin Alumni Research Foundation, Madison, WI (US); NewSouth Innovations Pty Limited, Sydney (AU)

(72) Inventors: Mark G. Friesen, Middleton, WI (US); Merritt Losert, Madison, WI (US); Susan Nan Coppersmith, Redfern (AU)

(73) Assignees: Wisconsin Alumni Research Foundation, Madison, WI (US); NewSouth Innovations Pty Limited, UNSW Sydney (AU)

( * ) Notice: Subject to any disclaimer, the term of this patent is extended or adjusted under 35 U.S.C. 154(b) by 706 days.

(21) Appl. No.: 17/842,988

(22) Filed: Jun. 17, 2022

(65) Prior Publication Data
US 2023/0085706 A1 Mar. 23, 2023

Related U.S. Application Data

(60) Provisional application No. 63/214,957, filed on Jun. 25, 2021.

(51) Int. Cl.
*H10F 77/14* (2025.01)
*H10F 77/122* (2025.01)

(52) U.S. Cl.
CPC ....... *H10F 77/1433* (2025.01); *H10F 77/122* (2025.01)

(58) Field of Classification Search
CPC .............. H10F 77/1433; H10F 77/122; H10D 48/3835; H10D 48/383; H10D 64/27;
(Continued)

(56) References Cited

U.S. PATENT DOCUMENTS 6,597,010 B2   7/2003   Eriksson et al.
9,941,430 B2   4/2018   Andreev et al.
(Continued)

FOREIGN PATENT DOCUMENTS

EP        3225587 A1    10/2017
WO    2002073527 A2     9/2002

OTHER PUBLICATIONS

Notice of Non-Final Rejection in KP Patent Application No. 10-2023-7043674 dated Nov. 18, 2024, English translation, 6 pages.
(Continued)

*Primary Examiner* — Sitaramarao S Yechuri
(74) *Attorney, Agent, or Firm* — Bell & Manning, LLC

(57) ABSTRACT

Gate-controlled quantum dots based on silicon-germanium (SiGe) alloy heterostructures are provided. Also provided are quantum computing systems incorporating the gate-controlled quantum dots. The quantum dots are formed in a semiconductor heterostructure in which a SiGe alloy quantum well is sandwiched between SiGe alloy barriers or between Ge barriers. The presence of germanium in the quantum dots increases the average valley splitting for quantum dots confined in the SiGe. As a result, the yield of quantum dots having a sufficiently high valley splitting for device applications is increased by the use of a SiGe alloy in the quantum well.

20 Claims, 5 Drawing Sheets

(58) Field of Classification Search
CPC .. H10D 64/205; H10D 62/812; H10D 62/822; H10D 62/832; B82Y 10/00
See application file for complete search history.

(56) References Cited

U.S. PATENT DOCUMENTS

| | | | |
|---|---|---|---|
| 10,572,814 | B2 | 2/2020 | Friesen et al. |
| 11,133,388 | B1 | 9/2021 | Joynt et al. |
| 2002/0179897 | A1* | 12/2002 | Eriksson ............ H10D 48/3835 257/14 |
| 2005/0141801 | A1 | 6/2005 | Gardner |
| 2009/0101887 | A1 | 4/2009 | Dahlstrom |
| 2009/0173934 | A1 | 7/2009 | Jain |
| 2011/0147711 | A1 | 6/2011 | Pillarisetty |
| 2014/0197376 | A1 | 7/2014 | Ma et al. |
| 2017/0012116 | A1 | 1/2017 | Pillarisetty et al. |
| 2019/0044045 | A1 | 2/2019 | Thomas |
| 2019/0044050 | A1 | 2/2019 | Pillarisetty |
| 2019/0334020 | A1 | 10/2019 | Amin |
| 2020/0203593 | A1 | 6/2020 | Roberts et al. |

OTHER PUBLICATIONS

Yang et al., "Spin-valley Lifetimes in a Silicon Quantum Dot with Tunable Valley Splitting," Nature Communications, 4:2069, 8 pages, 2013.
Zhang et al., "Genetic design of enhanced valley splitting towards a spin qubit in silicon," Nature Communications, 4:2396, 7 pages, 2013.
Srinivasen et al., "Valley splitting in Si quantum dots embedded in SiGe," Applied Physics letters, arXiv:0808.1234v1, Aug. 8, 2008.
Meghan Steele Horan, "Physicists device new approach to manipulate silicon 'quibits'" Phys.org, https://phys.org/news/2017-07-physicists-approach-silicon-qubits,html, Jul. 7, 2017.
Vandersypen et al., "Quantum computing with semiconductor spins," Physics Today 72, 8 38 (2019).
Hollmann et al., "Large, tunable valley splitting and single-spin relaxation mechanisms in a Si/SixGe1-x quantum dot," arXiv:1907.04146v2, Mar. 30, 2020.
McGuire et al., "Valley splitting in a Si/SiGe quantum point contact," New J. Phys,. 12, 033039, 2010.
Neyens et al., "Measurements of capacitive coupling within a quadruple quantum dot array," arXiv:907.08216v1, Jul. 18, 2019.
Watson et al., "A programmable two-qubit quantum processor in silicon," arXiv:1708.04214v2, May 31, 2018.
Kharche, Neerav, et al. "Valley splitting in strained silicon quantum wells modeled with 2 miscuts, step disorder, and alloy disorder." Applied Physics Letters 90.9 (2007): 092109.
Jiang, Zhengping, et al. "Effects of interface disorder on valley splitting in SiGe/Si/SiGe quantum wells." Applied Physics Letters 100.10 (2012): 103502.
Friesen, Mark, et al. "Practical design and simulation of silicon-based quantum-dot qubits." Physical Review B 67.12 (2003): 121301.
International Search Report and Written Opinion for International application No. PCT/US2022/033927, mailed Mar. 16, 2023, pp. 1-9.
Lawrie et al., Quantum dot arrays in silicon and germanium, Appl. Phys. Lett. 116, 080501, 2020, pp. 1-9.
Friesen, et al., "Valley Splitting Theory of SiGe/Si/SiGe Quantum Wells," arxiv.org, Cornell University Library, 201 Olin Library Cornell University Ithaca, NY 14853, Aug. 9, 2006, 13 pages, XP080248046, DOI: 10.1103/PHY SREVB.75.115318.
Scappucci, Giordano, "Semiconductor materials stacks for quantum dot spin qubits," arxiv.org, Feb. 23, 2021, 5 pages. XP081889896.
Extended European Search Report in EP Patent Application No. 22833911.5 dated Aug. 2, 2024, 12 pages.

* cited by examiner

SILICON-GERMANIUM ALLOY-BASED QUANTUM DOTS WITH INCREASED
ALLOY DISORDER AND ENHANCED
VALLEY SPLITTING

CROSS-REFERENCE TO RELATED APPLICATIONS

The present application claims priority to U.S. provisional patent application No. 63/214,957 that was filed Jun. 25, 2021, the entire contents of which are incorporated herein by reference.

REFERENCE TO GOVERNMENT RIGHTS

This invention was made with government support under W911NF-17-1-0274 awarded by the ARMY/ARO. The government has certain rights in the invention.

BACKGROUND

Silicon-Germanium (SiGe) heterostructures are used for many purposes in the modern electronics industry, forming the basis of devices such as SiGe heterojunction bipolar transistors and Si/SiGe modulation-doped field effect transistors. Most recently, SiGe alloys have become a material of choice for quantum computing applications. In particular, silicon quantum dots formed in the silicon well of a Si/SiGe heterostructure have been used to trap electrons in qubits for quantum computing, wherein the spins of the trapped electrons store and process quantum information. An advantage of the Si/SiGe heterostructures is that silicon provides a clean magnetic environment with a low noise level, a crucial requirement for quantum computing.

The electrons in silicon quantum wells of the Si/SiGe quantum dot structures can occupy different valleys in the conduction band structure. For most purposes, and for many quantum bits for quantum computing, this valley degree of freedom for electrons is an unwanted complication, since the additional transitions prevent clean control of qubit states in quantum computing devices. This unwanted complication occurs because the energy splitting between valley states is comparable to the energy splitting between electron spin states. Hence much effort has been put into making the valley splittings in the conduction band of silicon larger, with limited success.

Valley spilling in silicon is illustrated in FIG. 1. Bulk silicon has a six-fold orbital degeneracy that can be lifted by both strain and quantum confinement. Under tensile strain along the (001)—or equivalent—axes, the six-fold valley degeneracy in the silicon conduction band is reduced to two-fold. Quantum confinement further reduces this degeneracy. The energy gap to the first excited valley state is referred to as the valley splitting, $E_v$.

The energy splitting between nearly degenerate valley states depends on the atomistic details of the quantum well. In many cases, it is desirable to engineer the valley splitting to be very large (much larger than the thermal energy), so that it becomes very difficult to excite the valley states. In work to date, large valley splittings have been pursued through careful attention to the heterostructure growth, aiming to obtain atomistically sharp Si/SiGe interfaces, with no Ge content inside the quantum well. This goal is extremely difficult to achieve in practice, however, and the resulting interfaces are rife with atomistic disorder. Various types of disorder are present, including atomic steps at the interface boundaries, Ge diffusion into the quantum well, and natural random-alloy disorder of the Ge and Si atoms in the SiGe alloy. A notable consequence of such disorder is variations of the valley splittings even for deterministically designed quantum wells, which occur in devices across the same chip. As a result, the yield of quantum dots with valley splittings above a practical threshold value (e.g., ~5-10 times the thermal energy) is unacceptably low.

SUMMARY

Gate-controlled quantum dot devices, quantum computing devices that incorporate the gate-controlled quantum dot devices, and methods of using the quantum computing devices are provided.

One example of a gate-controlled quantum dot device includes: a semiconductor heterostructure comprising: a first barrier comprising a silicon-germanium alloy or germanium; a second barrier comprising a silicon-germanium alloy or germanium; and a quantum well comprising a silicon-germanium alloy having random alloy disorder disposed between the first barrier and the second barrier, wherein the germanium concentration in the silicon-germanium alloy of the quantum well is lower than the germanium concentration in the first and second barriers; and one or more electrostatic gates in electrical communication with the semiconductor heterostructure, wherein the one or more electrostatic gates are configured to apply a controllable potential to the quantum well, wherein the controllable potential forms at least one quantum dot comprising a confined electron in the quantum well.

One example of a quantum computing device for performing quantum computation includes: a gate-controlled quantum dot device of a type described herein; a controller for controlling the potential applied by the one or more electrostatic gates; and a sensor for reading out a spin state of at least one electron in at least one quantum dot.

One example of a method of using a quantum computing device of a type described herein includes the steps of: applying the controllable potential to the one or more electrostatic gates to form the at least one quantum dot; and sensing the spin state of at least one electron in the at least one quantum dot.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

In FIG. 5A, with 0% Ge in the quantum well, the range for $\delta\Delta$ is small, so the average valley splitting is small. In FIG. 5B, with 15% Ge in the quantum well, this range is much larger, so the average valley splitting is also larger.

DETAILED DESCRIPTION

Figure 1:
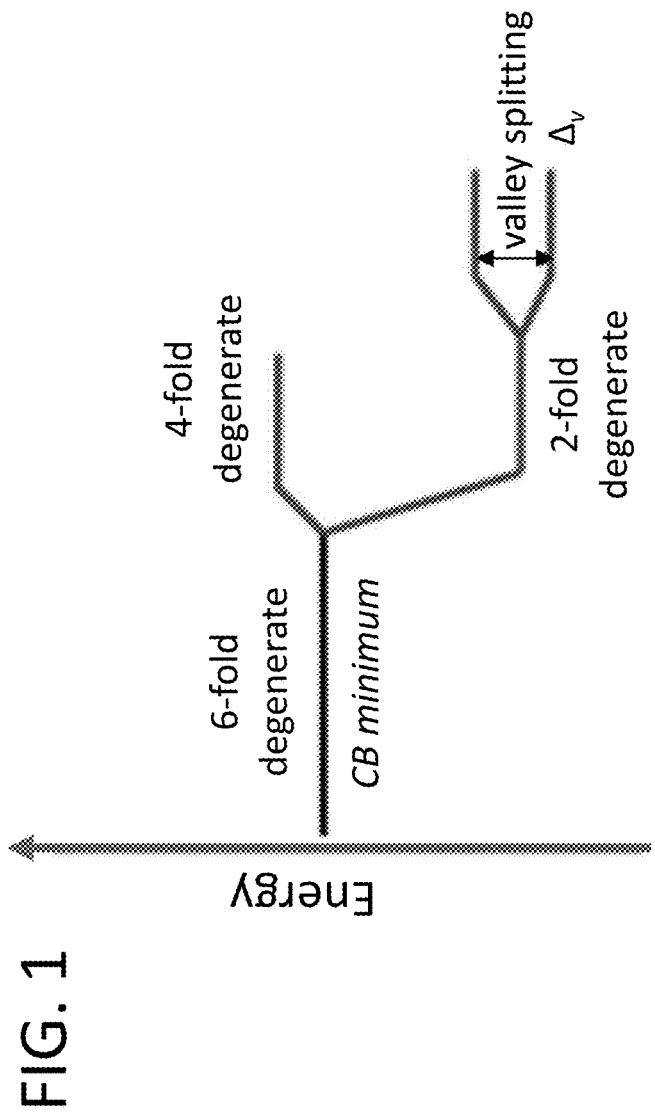
FIG. 1 is a band energy diagram showing the valley splitting in strained and quantum confined silicon.

Gate-controlled quantum dots based on silicon-germanium (SiGe) alloy heterostructures are provided. Also provided are quantum computing systems incorporating the gate-controlled quantum dots. The quantum dots are formed in a semiconductor heterostructure in which a SiGe alloy quantum well is sandwiched between SiGe alloy barriers or between Ge barriers. The presence of germanium in the quantum well increases the average valley splitting for quantum dots confined in the SiGe, relative to the average valley splitting for quantum dots confined in a pure silicon quantum well. As a result, the yield of quantum dots having a sufficiently high valley splitting for device applications can be dramatically increased by the use of a SiGe alloy in the quantum well.

In the semiconductor heterostructures, the first and second barrier layers comprise a SiGe alloy or Ge. For SiGe barriers, the SiGe alloy of the barrier layer can be represented by the formula $Si_xGe_{(1-x)}$, wherein $0 \leq x < 1$. The SiGe alloy of the quantum well also can be represented by the formula $Si_xGe_{(1-x)}$, wherein $0 \leq x < 1$ and further wherein the germanium concentration in the SiGe alloy of the well is lower than the germanium concentration of the SiGe alloy of barriers in order to provide a potential well that is sufficiently deep to trap an electron.

Notably, unlike previous attempts to increase the valley splitting in silicon, the present approach to quantum well design does not rely on a deterministic design in which the atomic order within the quantum well is carefully controlled. For example, one existing approach to engineering the valley splitting in a silicon-based quantum dot is to make a quantum well out of pure silicon between SiGe alloy barriers with atomically sharp interfaces. This design is intended to minimize concentration fluctuations in the quantum well, where the electron wavefunction is concentrated. In contrast, the quantum wells described herein do not rely on atomically sharp interfaces between barrier layers and a quantum well layer or the exclusion of germanium from the quantum well. In fact, the inventions described herein can be attributed, at least in part, to the inventors' discovery that introducing germanium into a silicon quantum well actually has the positive effect of increasing, on average, the valley splittings for quantum dots confined in the quantum well and provides a very high yield of quantum dots having valley splittings greater than 100 μeV.

In addition, because the quantum wells are composed of a SiGe alloy, the composition of the well is uniform on a global scale throughout the well, but is characterized by local fluctuation in the concentration of germanium due to the random positional disorder of the atoms that is inherent in an alloy. These concentration fluctuations arise because, in the $Si_xGe_{1-x}$, alloy, the value of x is constant on a global scale across the well, but each atom position within the well is randomly populated, with the probability of any particular atom being Si equal to x. For the purposes of this disclosure, a SiGe alloy in which the probability of a given atom being a silicon atom is uniform throughout the alloy, but in which the identity of the atom at any particular position is determined by random population is referred to as an alloy having random alloy disorder. Thus, a SiGe alloy having random alloy disorder is distinguishable from germanium-seeded silicon in which the germanium concentration has a regular oscillating profile across the quantum well, as described in U.S. patent application Ser. No. 16/936,697.

Although the inventors do not intend to be bound to any particular theory of the invention, the positive effect produced by the use of a layer of SiGe alloy as a quantum well can be explained by the dominant role played by local random concentration fluctuations, which are inevitable with alloy disorder, in producing a wide range of possible valley splittings in SiGe alloys. The approach to quantum dot fabrication described herein takes advantage of the positive effects of this random disorder by intentionally increasing, rather than decreasing, the germanium concentration in the quantum well. This leads to significant concentration fluctuations inside the quantum well, where the electron wavefunction is large. As a result, a wide range of local valley splittings are produced in the SiGe alloy of the quantum well, with the majority of the valley splittings having energies of 100 μeV or larger.

Using this approach, the value of the valley splitting for any particular quantum dot confined within a well is not controlled. However, because of the broad energy spectrum, the average valley splitting value for the quantum dots in an array of quantum dots fabricated in the SiGe heterostructures is large. Thus, using the present approach, arrays of many quantum dots in which the average valley splitting for the quantum dots in the array is very large can be fabricated. Such arrays may contain 100 or more quantum dots, 1000 or more quantum dots, or 10,000 or more quantum dots. By way of illustration, quantum dot arrays in which the average valley splitting energy for the quantum dots is greater than 200 μeV, greater than 300 μeV, or even greater than 400 μeV can be produced. For example, arrays can be fabricated in which the average valley splitting energy is in the range from 100 μeV to 1000 μeV, including arrays in which the average valley splitting energy is in the range from 200 μeV to 500 μeV. Moreover, these high average values reflect a high yield of quantum dots having valley splittings sufficiently high to enable quantum computing applications. As demonstrated in the Example, quantum dot arrays in which at least 90% of the quantum dots would have a quantum well valley splitting of at least 100 μeV can be fabricated in the SiGe heterostructures described herein. This includes quantum dot arrays in which at least 95%, at least 98%, and at least 99% of the quantum dots have a quantum well valley splitting of at least 100 μeV.

The SiGe heterostructures can be fabricated via epitaxial growth using a variety of known methods. For example, a first SiGe barrier layer can be formed on a growth substrate, such as a silicon wafer, by growing a graded layer with increasing Ge concentration epitaxially until it terminates in the desired SiGe composition. Alternatively, Ge can be used as the growth substrate and a graded layer with increasing Si concentration can be grown epitaxially until it terminates in the desired SiGe composition. A first Ge barrier layer can also be grown epitaxially using a silicon growth substrate. The SiGe quantum well and the second SiGe barrier, or the second Ge layer, can then be grown sequentially on the first barrier via epitaxy. The relative germanium concentrations and the thicknesses of the barrier layers and the quantum well layer are selected to provide quantum confinement of electrons in the well, with typical thicknesses for the active region ranging from tens to hundreds of nanometers.

Generally, for SiGe barriers, it is sufficient for the germanium concentration in the barriers to exceed the germanium concentration in the quantum well by 15 atomic percent (at. %) or more. In some embodiments, the germanium concentration in the barriers exceeds the germanium concentration in the quantum well by at least 20 at. %. By way of illustration, heterostructures in which the SiGe alloy of the barriers has a germanium concentration in the range from 25 at. % to 35 at. % and the SiGe alloy of the quantum well has a germanium concentration in the range from 5 at. % to 15 at. % can be used. If Ge barriers are used, the silicon concentration in the SiGe quantum well is desirably at least 40 at. %.

Once the heterostructures are formed, one or more electrodes (electrostatic gates) can be used to define one or more quantum dots in the heterostructures, and these one or more quantum dots can act as qubits in a quantum information processing device. In gate-controlled quantum dot systems, the electrostatic gates provide a controllable horizontal potential profile for the confinement of electrons in three dimensions. The movement of electrons in the quantum dots is restricted due to the confining potential, which results in bound states with discrete energy levels. The wavefunctions describing these states may then be utilized to establish the two-level system. Specifically, if the spatial part of an electron wavefunction is used, a charge qubit is achieved, with the spatial wavefunction defining the electron charge distribution. In other embodiments, the spin portion of the wavefunction is used and a spin qubit is produced, or both the spin and charge portions of the wavefunctions are used in a hybrid qubit. By tuning the confinement strength and electrochemical potential using lateral and/or vertical gates, as well as the coupling to other dots or reservoirs, the size and occupation of each dot can be controlled to obtain a wide variety of quantum systems for use in quantum computation.

Figure 2:
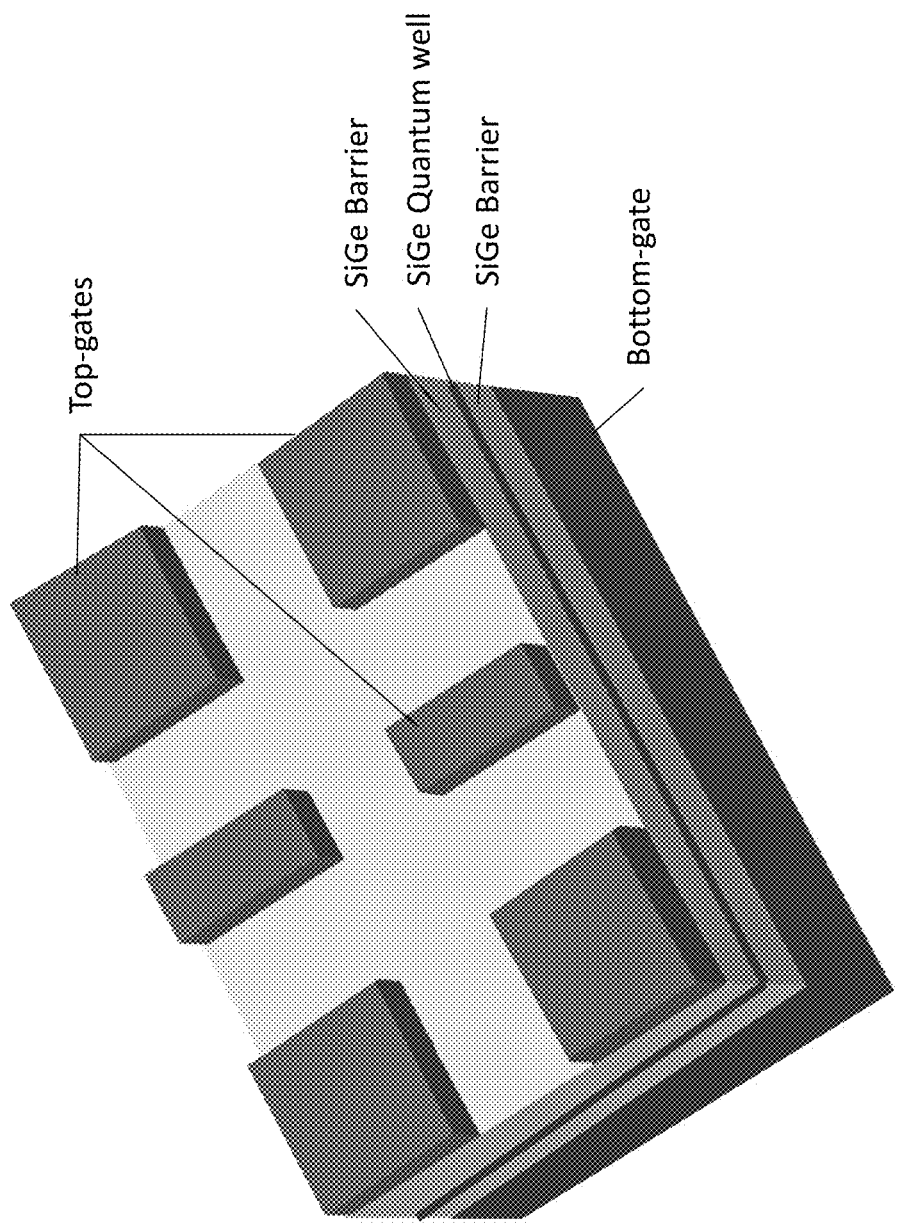
FIG. 2 is a schematic diagram of a gate-controlled two quantum dot device in which an electron is confined in each of two local potential minima defined by the top and bottom electrostatic gates.

A number of strategies can be used for designing electrostatic gates for applying electric fields to the heterostructures in order to define quantum dots and to perform qubit transformations in a quantum computing system. Descriptions of suitable gate configurations can be found in the literature, including in the following references: S. F. Neyens et al., *Phys. Rev. Applied* 12, 064049 (2019); and T. F. Watson et al., *Nature* 555, 633 (2018). One example of a quantum dot device in which top and bottom electrostatic gates are used to define two quantum dots in an SiGe quantum well layer sandwiched between upper and lower SiGe barrier layers is shown in FIG. 2.

One example of a quantum computing system into which qubits can be incorporated includes at least two qubits located in quantum dots based on the heterostructures described herein. In some embodiments, more qubits are included in a quantum dot assembly. The system also includes a controller for controlling the qubits to perform a quantum computation and an output for providing a report generated using information obtained from the quantum computation performed.

Figure 3:
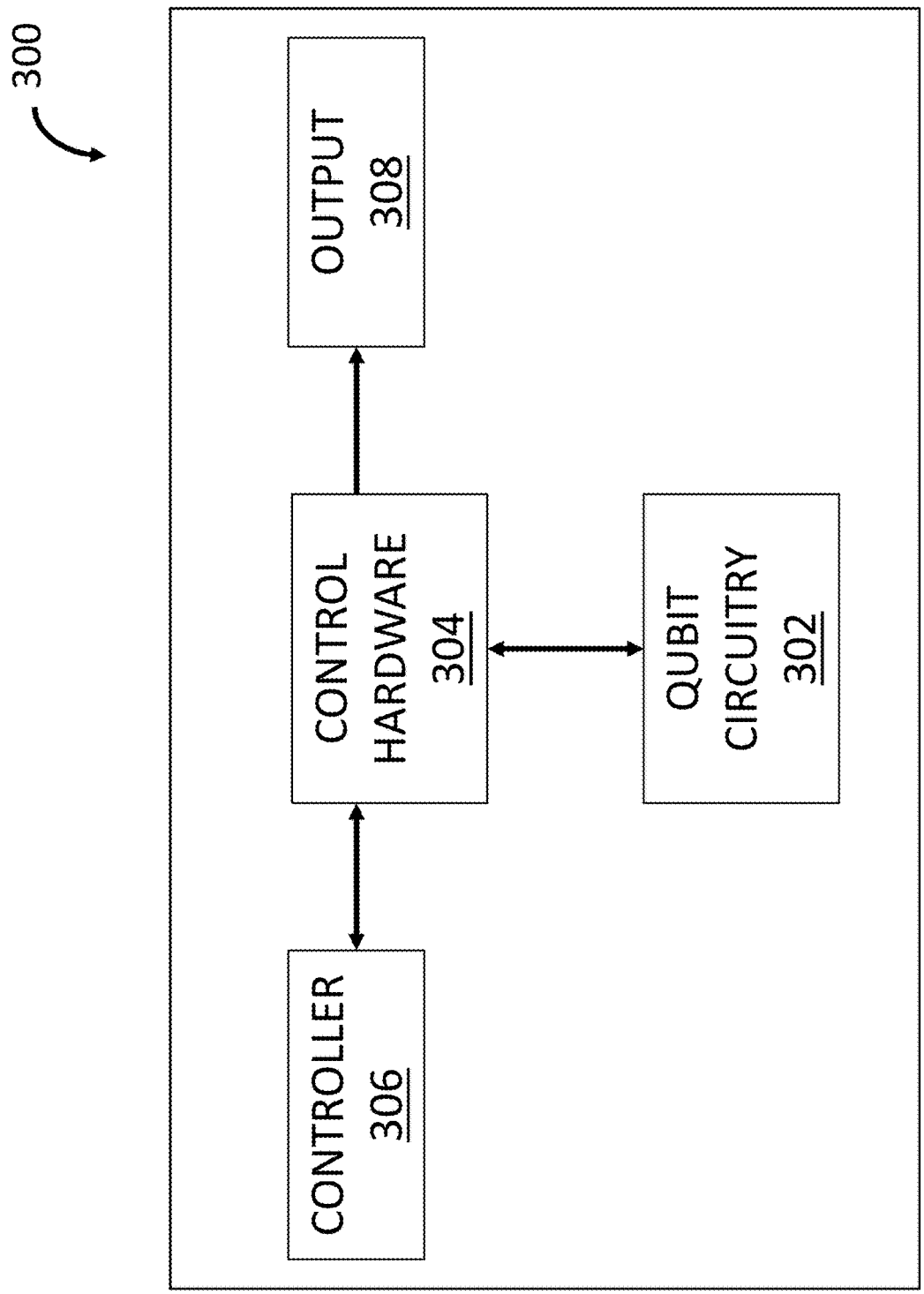
FIG. 3 is a schematic of an example system for use in quantum computation.

Turning now to FIG. 3, an example quantum computing system 300 for quantum computation or quantum information processing in accordance with the present disclosure is shown. As shown, the system 300 can include qubit circuitry 302, control hardware 304 in communication with the qubit circuitry 302, and a controller 306 for directing the control hardware 304 to carry out various qubit manipulations and measurements, along with other operations. The system 300 also includes an output 308 for providing the quantum computation results. In general, the system 300 may be configured to operate over a broad range of conditions, and as such may include capabilities and hardware for achieving those conditions. For instance, although not shown in FIG. 3, the system 300 may be configured to achieve and sustain ultra-low temperatures, such as temperatures below a few Kelvin, using, for example, a refrigeration unit.

The qubit circuitry may be configured to initialize a qubit, perform qubit transformations, and read out the final state of a qubit or qubits. For instance, the qubit circuitry 302 may include one or more metallic gates configured to control charge confinement and states of the quantum dots in a quantum dot assembly. In addition to gates, the qubit circuitry 302 may also include one or more charge sensors coupled to the quantum dot assembly configured for measuring qubit states. Example charge sensors can include tunnel probes, quantum point contacts, single electron transistors, as well as other sensors for sensing charge. In addition, the qubit circuitry 302 may also include one or more sources or drains for measuring charge transport. Furthermore, the qubit circuitry 302 may also include elements for coupling of the quantum dot assembly to external components.

Referring again to FIG. 3, the control hardware 304 can include any number of electronic systems, hardware, or circuitry components capable of a wide range of functionality for controlling the qubit circuitry 302. For instance, the control hardware 304 can include one or more voltage sources, current sources, microwave sources, spectrometers, signal generators, amplifiers, and so forth. Such control hardware 304 may be configured to send, receive, and process a wide array of signals. For example, the control hardware 304 may be configured to generate a number of pulsed voltages, or currents, to achieve pulsed gates for implementing qubit operations.

In general, the control hardware 304, as directed by the controller 306, may be used to prepare the qubit(s) formed by the qubit circuitry 302, as described. For instance, the control hardware 304 may be configured to populate the quantum dot assembly with one or more electrons (or holes). In addition, the control hardware 304 may be configured to form qubit states for the charge qubit using different charge distributions having the same center of mass. In some aspects, the control hardware 304 may prepare and manipulate the qubit(s).

The control hardware 304 may perform a number of quantum logic operations, including the application of ac gates, dc gates, pulsed gates, and combinations thereof. The control hardware 304 can then read out the qubits(s), for instance, using one or more charge sensors, and provide, via the output 308, a report of any form for the quantum computation results obtained.

EXAMPLE

This Example illustrates the effect of a SiGe quantum well on valley splitting spread and average valley splitting. In this Example, a quantum well layer in which 95% of the simulated valley splittings were greater than 100 µeV is demonstrated.

Simulations of Quantum Wells with Alloy Disorder

To simulate the valley splitting in a quantum well with alloy disorder, the 1D tight-binding model of Boykin et. al. was used, which was modified to account for strain effects. (Timothy B. Boykin, et al., *Phys. Rev. B*, 70:165325, October 2004; Mark Friesen. Tight-binding model for studying alloy disorder, 2021. Unpublished manuscript; Merritt Losert. Valley splitting variance due to Si concentration fluctuations in the quantum well, 2021. Unpublished manuscript.) An ideal concentration profile was started with, like that in FIG. 4B, and random noise was added at each layer, drawn from a binomial distribution. This is consistent with each atom at layer l having a probability of being Ge given by the Ge concentration at layer l in the ideal distribution. The variance of this distribution depends on the quantum dot size, which is determined by its orbital excitation. Here a typical value of $\hbar\omega=2$ meV was assumed. This sampling was repeated many times, and for each concentration profile the valley splitting was simulated, thus building up a statistical distribution.

Figure 4A:
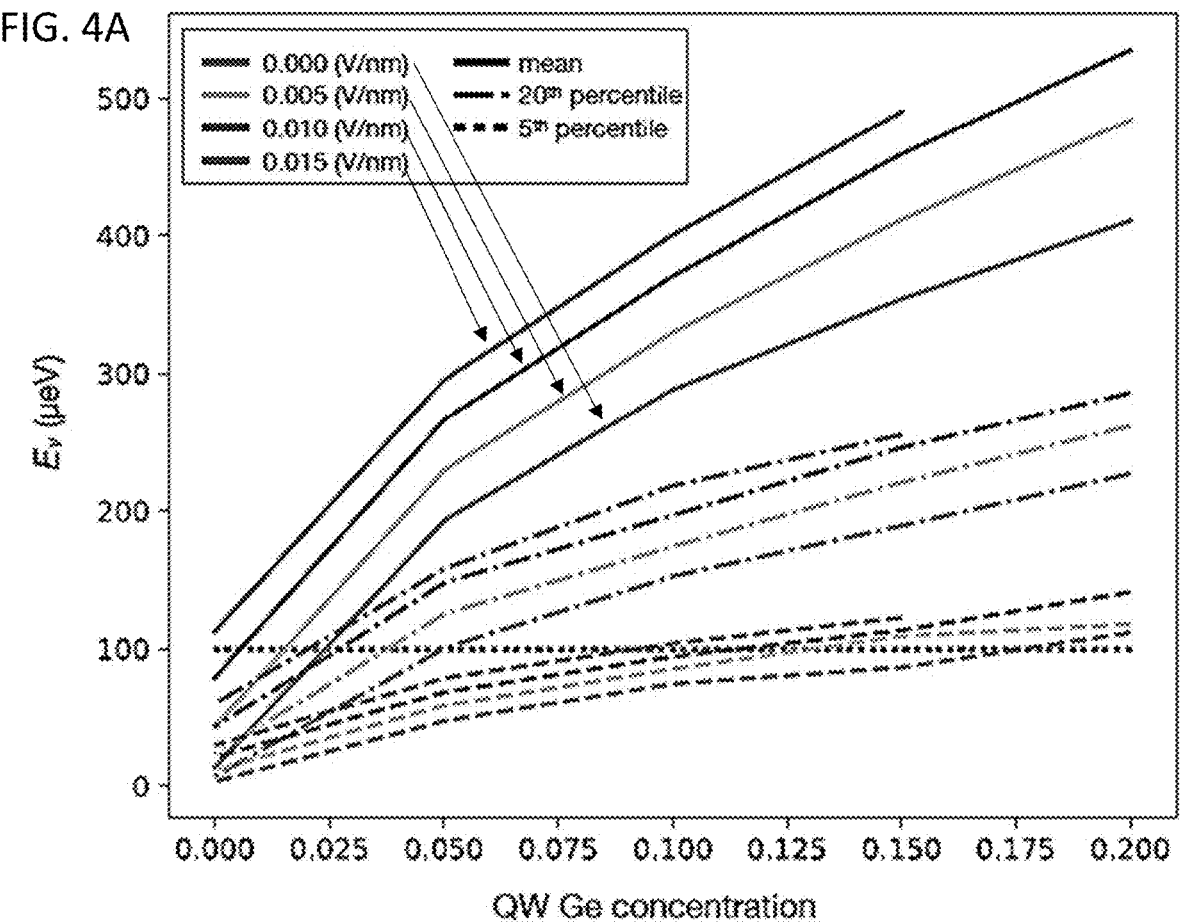
FIG. 4A shows the mean valley splitting, 20th percentile, and 5th percentile for 2000 tight-binding simulations plotted as a function of Ge content in the quantum well for the simulation described in the Example.
Figure 4B:
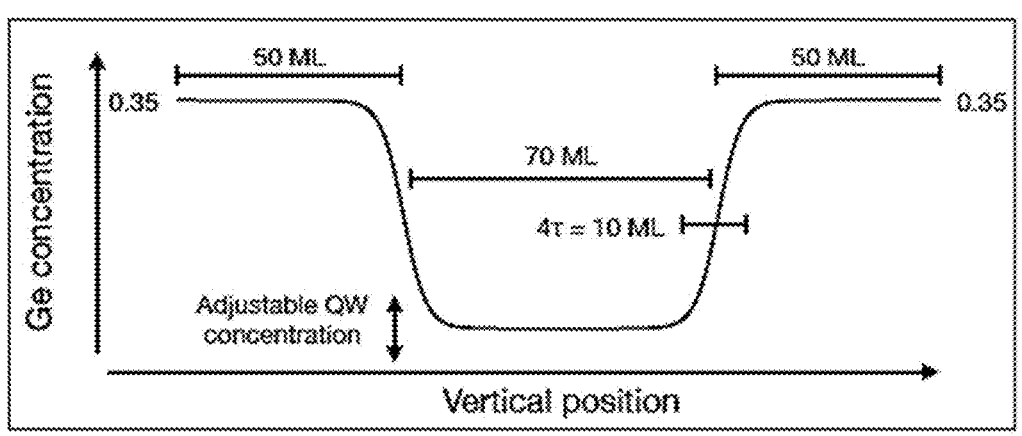
FIG. 4B shows the ideal heterostructure profile used in the simulations. The low Ge concentration region is the quantum well, and the high Ge concentration regions are barriers. A realistically diffused interface was assumed, with characteristic width $4\pi=10$ atomic monolayers (ML).

FIGS. 4A-4B show the results of tight-binding simulations of many randomly generated heterostructures, with Ge content in the quantum well given on the x-axis. Plotted are the mean valley splitting (solid lines), the 20th percentile (dot-dashed lines), and the 5th percentile (dashed lines) at various electric fields. As the Ge content increased, so did the valley splitting. With 10-15% Ge in the quantum well, about 95% of simulated devices were found to have valley splittings greater than 100 µeV, which is a workable number for these devices.

Theoretical Explanation of the Valley Splitting Variations

In this section, a theoretical explanation is provided for the valley splitting variations observed in the simulations. In an ideal heterostructure, the Si concentration at layer l is given by a fixed quantity $\bar{x}_l$ which is specified by the design. However, if each layer in a quantum well is composed of a random distribution of Si and Ge atoms, then there will be small fluctuations in the concentrations of Si and Ge at each layer. Due to alloy disorder and the finite size of a quantum dot, there will always be some uncertainty, and the actual Si concentration at layer l, weighted by the dot probability distribution, can be written as $x_l^{dot}=\bar{x}_l+\delta_l$, where $\bar{x}_l$ is the deterministic (intended) concentration, and $\delta_l$ is the random deviation from the deterministic value. These fluctuations were found to have a significant impact on the valley splitting. Specifically, it was found that for wells with large random fluctuations, the average valley splitting tends to be larger, as indicated in FIGS. 4A-4B.

From effective mass theory, it was known that the valley splitting can be modeled as $E_v=2|\Delta|$, where the matrix element is given by (Mark Friesen et al., *Physical Review B*, 75(11):115318, March 2007; Losert, 2021.)

$$\Delta = s\frac{a_0}{4}\sum_l e^{2ik_0 z_l} U(z_l)|\psi_{env}(z_l)|^2, \quad (1)$$

where $a_0=0.543$ (nm) is the Si cubic lattice constant, $k_0=0.82\cdot2\pi/a_0$ is the position of valley minimum in the Brillouin zone of the Si conduction band, $\psi_{env}(z)$ is the 1D envelope function, s is a strain-correction factor, U (z) is the quantum well confinement potential, and the sum is taken over the layers in the heterostructure.

The quantum well potential can be modeled as $$U(z_l) = \frac{x_l^{dot} - x_{sub}}{1 - x_{sub}}\Delta E_c,$$

where $x_l^{dot}$ is the Si concentration at layer l felt by a quantum dot, $x_{sub}$ is the average Si concentration in the quantum well barriers and in the substrate, and $\Delta E_c$ is the average conduction band offset between the barriers and the quantum well, which determines the quantum well confinement. The random alloy fluctuations that were studied are contained in $U(z_l)$.

The above definition of $U(z_l)$ can now be inserted into Eq. 1 and the equation can be rewritten in the form $\Delta=\Delta_0+\delta\Delta$, where $\Delta_0$ contains the fixed, deterministic effects of the hetero structure, and $\delta\Delta$ contains the effects of the randomness of $\delta_l$:

$$\Delta_0 = s\frac{a_0}{4}\frac{\Delta E_c}{1-x_{sub}}\sum_l e^{2ik_0 z_l}(\bar{x}_l - x_{sub})|\psi_{env}(z_l)|^2. \quad (2)$$

$$\delta\Delta = s\frac{a_0}{4}\frac{\Delta E_c}{1-x_{sub}}\sum_l e^{2ik_0 z_l}\delta_l|\psi_{env}(z_l)|^2.$$

Figure 5B:
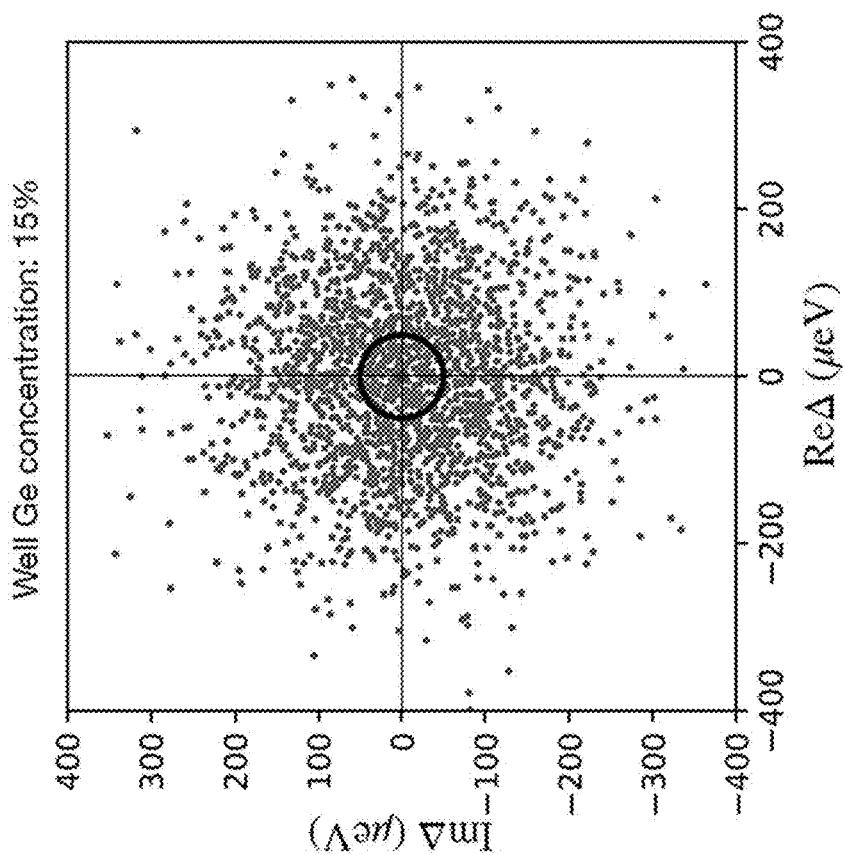
FIGS. 5A-5B show a representation of the valley splitting contributions of $\Delta_0$ and $\delta\Delta$ in the complex plane for a quantum well having a germanium concentration of 0% (FIG. 5A) and a quantum well having a germanium content of 15% (FIG. 5B). The center dot represents the deterministic value $\Delta_0$ arising from a quantum well without alloy disorder, and the other dots represent the actual values of $\Delta$ calculated numerically for 2000 different quantum wells, both at zero electric field. The values of $\Delta_0$ are small but nonzero, $-5.81\times10^{-5}+9.22\times10^{-4}i$ ($\mu$eV) in FIG. 5A and $-1.94\times10^{-5}+3.08\times10^{-4}i$ ($\mu$eV) in FIG. 5B, highlighting the fact that alloy disorder is the dominant source of valley splitting. The valley splitting for a given $\Delta_0$ and $\delta\Delta$ is $2|\Delta_0+\delta\Delta|$, so the broader the spread of the valley splitting value, due to the fluctuation contribution $\delta\Delta$, the larger the average valley splitting. Most importantly, the larger the spread, the smaller the fraction of valley splittings falling inside the unacceptably small range, indicated by the black circle.
Figure 5A:
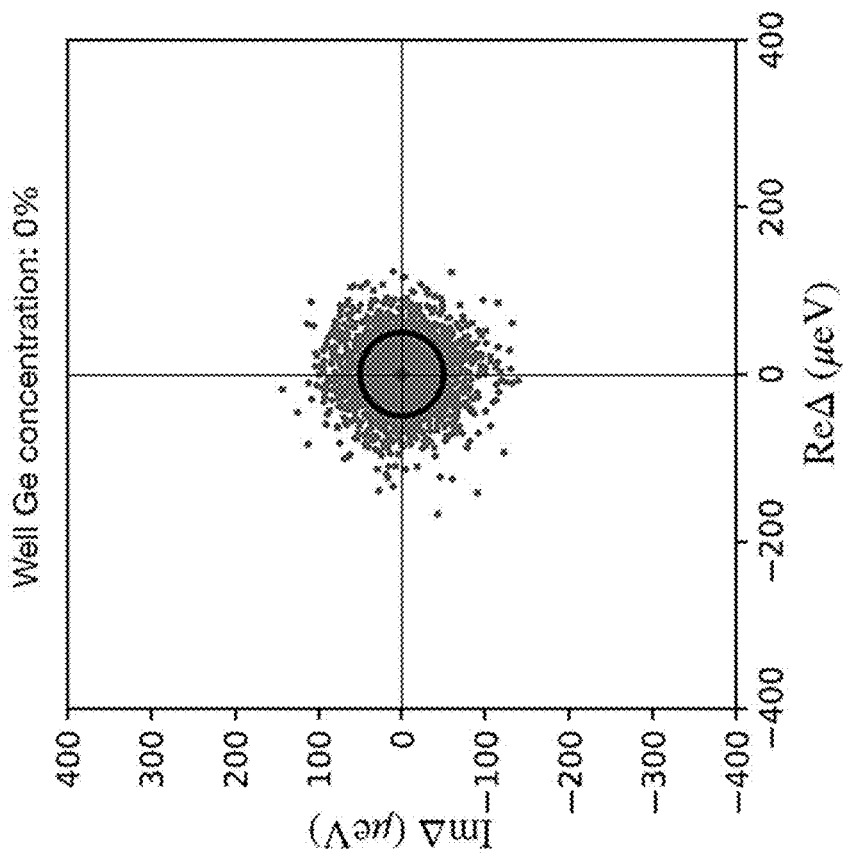

FIGS. 5A-5B show the separate contributions of $\Delta_0$ and $\delta\Delta$, calculated numerically for two different quantum well Ge concentrations. Since $\Delta$ is a complex quantity, it was plotted here on the complex plane. The deterministic valley splitting $\Delta_0$ corresponds to a single point in the plot, indicated by the center dot. The results of many simulations including alloy disorder show variations of the valley splitting that differ from $\Delta_0$ by $\delta\Delta$. For realistic devices, $\Delta_0$ tends to be fairly small due to the unavoidable broadening of the quantum well interface and other forms of disorder at the quantum well interface. In this example, increasing $\delta\Delta$ was focused on instead. If $x_l<1$ in the quantum well, then the variance of $\delta\Delta$ increased, and so did the expected average value of the valley splitting. The black circle in the figure indicates valley splittings of 100 µeV, with smaller valley splittings falling inside the circle. The key observation is that for a large enough spread of valley splittings, arising due to the fluctuation contributions $\delta\Delta$, the fraction of unacceptably small valley splittings that fell inside this circle could be significantly reduced. In this way, well-controlled valley splittings were not achieved, but valley splittings that were reliably large were achieved.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" can mean only one or can mean "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A gate-controlled quantum dot device comprising:
   a semiconductor heterostructure comprising:
   a first barrier comprising a silicon-germanium alloy or germanium;
   a second barrier comprising a silicon-germanium alloy or germanium; and
   a quantum well comprising a silicon-germanium alloy having random alloy disorder and a two-fold valley degeneracy at its conduction band minimum disposed between the first barrier and the second barrier, wherein the germanium concentration in the silicon-germanium alloy of the quantum well is lower than the germanium concentration in the first and second barriers; and
   one or more electrostatic gates in electrical communication with the semiconductor heterostructure, wherein the one or more electrostatic gates are configured to apply a controllable potential to the quantum well, wherein the controllable potential forms at least one quantum dot comprising a confined electron in the quantum well.

2. The device of claim 1, wherein the first and second barriers comprise the silicon germanium alloy.

3. The device of claim 2, wherein the at least one quantum dot has a valley splitting of at least 100 µeV.

4. The device of claim 2, wherein the at least one quantum dot has a valley splitting in the range from 100 µeV to 600 µeV.

5. The device of claim 2, wherein the one or more electrostatic gates are configured to apply the controllable potential to form an array of quantum dots in the quantum well, each quantum dot comprising at least one confined electron.

6. The device of claim 5, wherein the average valley splitting for the quantum dots in the array of quantum dots is at least 100 µeV.

7. The device of claim 2, wherein the germanium concentration in the silicon-germanium alloy of the quantum well is at least 15 atomic percent lower than the germanium concentration in the silicon-germanium alloys of the first and second barriers.

8. The device of claim 2, wherein the germanium concentration in the silicon-germanium alloy of the quantum well is in the range from 5 atomic percent to 15 atomic percent.

9. The device of claim 2, wherein the germanium concentration in the silicon-germanium alloy of the quantum well is in the range from 5 atomic percent to 15 atomic percent; the germanium concentration in the silicon-germanium alloy of the quantum well is at least 15 atomic percent lower than the germanium concentration in the silicon-germanium alloys of the first and second barriers; and the quantum dot has a valley splitting in the range from 100 µeV to 600 µeV.

10. The device of claim 1, wherein the at least one quantum dot has a valley splitting of at least 100 µeV.

11. The device of claim 1, wherein the at least one quantum dot has a valley splitting in the range from 100 µeV to 600 µeV.

12. The device of claim 1, wherein the one or more electrostatic gates are configured to apply the controllable potential to form an array of quantum dots in the quantum well, each quantum dot comprising at least one confined electron.

13. The device of claim 12, wherein the average valley splitting for the quantum dots in the array of quantum dots is at least 100 µeV.

14. The device of claim 13, wherein the array of quantum dots comprises 1000 or more quantum dots.

15. The device of claim 1, wherein the germanium concentration in the silicon-germanium alloy of the quantum well is in the range from 5 atomic percent to 15 atomic percent.

16. A quantum computing device for performing quantum computation, the quantum computing device comprising:
    a semiconductor heterostructure comprising:
    a first barrier comprising a silicon-germanium alloy or germanium;
    a second barrier comprising a silicon-germanium alloy or germanium; and
    a quantum well comprising a silicon-germanium alloy having random alloy disorder and a two-fold valley degeneracy at its conduction band minimum disposed between the first barrier and the second barrier, wherein the germanium concentration in the silicon-germanium alloy of the quantum well is lower than the germanium concentration in the first and second barriers; and
    one or more electrostatic gates in electrical communication with the semiconductor heterostructure, wherein the one or more electrostatic gates are configured to apply a controllable potential to the quantum well, wherein the controllable potential forms at least one quantum dot comprising a confined electron in the quantum well;
    a controller for controlling the potential applied by the one or more electrostatic gates; and
    a sensor for reading out a spin state of at least one electron in at least one quantum dot.

17. The quantum computing device of claim 16, wherein the one or more electrostatic gates are configured to apply the controllable potential to form an array of 10,000 or more quantum dots in the quantum well, wherein an average valley splitting for the quantum dots in the array of quantum dots is at least 100 µeV.

18. A method of using a gate-controlled quantum dot device comprising:
    a semiconductor heterostructure comprising:
    a first barrier comprising a silicon-germanium alloy or germanium;
    a second barrier comprising a silicon-germanium alloy or germanium; and
    a quantum well comprising a silicon-germanium alloy having random alloy disorder and a two-fold valley degeneracy at its conduction band minimum disposed between the first barrier and the second barrier, wherein the germanium concentration in the silicon-germanium alloy of the quantum well is lower than the germanium concentration in the first and second barriers; and
    one or more electrostatic gates in electrical communication with the semiconductor heterostructure, wherein the one or more electrostatic gates are configured to apply a controllable potential to the quantum well, wherein the controllable potential forms at least one quantum dot comprising a confined electron in the quantum well, the method comprising: applying the controllable potential to the one or more electrostatic gates to form the at least one quantum dot.

19. A method of using a quantum computing device for performing quantum computation, the quantum computing device comprising:
a semiconductor heterostructure comprising:
a first barrier comprising a silicon-germanium alloy or germanium;
a second barrier comprising a silicon-germanium alloy or germanium; and
a quantum well comprising a silicon-germanium alloy having random alloy disorder and a two-fold valley degeneracy at its conduction band minimum disposed between the first barrier and the second barrier, wherein the germanium concentration in the silicon-germanium alloy of the quantum well is lower than the germanium concentration in the first and second barriers; and
one or more electrostatic gates in electrical communication with the semiconductor heterostructure, wherein the one or more electrostatic gates are configured to apply a controllable potential to the quantum well, wherein the controllable potential forms at least one quantum dot comprising a confined electron in the quantum well;
a controller for controlling the potential applied by the one or more electrostatic gates; and
a sensor for reading out a spin state of at least one electron in at least one quantum dot, the method comprising:
applying the controllable potential to the one or more electrostatic gates to form the at least one quantum dot; and
sensing the spin state of at least one electron in the at least one quantum dot.

20. The method of claim 19, wherein the one or more electrostatic gates are configured to apply the controllable potential to form an array of 10,000 or more quantum dots in the quantum well, wherein an average valley splitting for the quantum dots in the array of quantum dots is at least 100 µeV.

* * * * *